United States Patent
Soptica

(10) Patent No.: US 11,149,863 B2
(45) Date of Patent: Oct. 19, 2021

(54) VALVE FOR MIXING TWO GAS FLOWS

(71) Applicant: Vitesco Technologies GmbH, Hannover (DE)

(72) Inventor: Silviu Soptica, Giroc (RO)

(73) Assignee: Vitesco Technologies GmbH, Hannover (DE)

( * ) Notice: Subject to any disclaimer, the term of this patent is extended or adjusted under 35 U.S.C. 154(b) by 43 days.

(21) Appl. No.: 16/628,893

(22) PCT Filed: Jun. 26, 2018

(86) PCT No.: PCT/EP2018/067068
§ 371 (c)(1),
(2) Date: Jan. 6, 2020

(87) PCT Pub. No.: WO2019/007751
PCT Pub. Date: Jan. 10, 2019

(65) Prior Publication Data
US 2021/0131573 A1 May 6, 2021

(30) Foreign Application Priority Data

Jul. 7, 2017 (EP) .................................. 17465529

(51) Int. Cl.
*F16K 11/07* (2006.01)
*F16K 31/528* (2006.01)

(52) U.S. Cl.
CPC ...... *F16K 11/0716* (2013.01); *F16K 31/5286* (2013.01)

(58) Field of Classification Search
CPC ............. F16K 11/0716; F16K 31/5286; Y10T 137/86815
See application file for complete search history.

(56) References Cited

U.S. PATENT DOCUMENTS

| | | | | |
|---|---|---|---|---|
| 1,980,770 A | * | 11/1934 | Thomas | ...................... C10J 1/00 48/184 |
| 2,383,215 A | * | 8/1945 | Reynolds | ........... G05D 23/1346 236/12.22 |

(Continued)

FOREIGN PATENT DOCUMENTS

| CN | 2641395 Y | 9/2004 |
|---|---|---|
| CN | 2903605 Y | 5/2007 |

(Continued)

OTHER PUBLICATIONS

Office Action dated Dec. 8, 2020 issued in Korean Patent Application No. 10-2020-7001609.

(Continued)

*Primary Examiner* — Kevin R Barss
(74) *Attorney, Agent, or Firm* — Cozen O'Connor

(57) ABSTRACT

A valve for mixing two gas streams, having a housing, a first gas inlet, a second gas inlet, and a gas outlet. The gas inlets are fluidically connected to the gas outlet. Downstream of the first gas inlet there is a guide element mounted displaceably inside the housing. By displacing the guide element, it is possible to control a flow cross section of a flow transfer opening for the transfer flow of the gas volume flowing in through the first gas inlet to the gas outlet through the guide element.

10 Claims, 2 Drawing Sheets

(56) References Cited

U.S. PATENT DOCUMENTS

| | | | | | |
|---|---|---|---|---|---|
| 3,561,483 | A | * | 2/1971 | Taplin | G05D 11/003 |
| | | | | | 137/625.4 |
| 3,765,451 | A | * | 10/1973 | Andersson | F16K 11/074 |
| | | | | | 137/625.4 |
| 6,599,136 | B2 | * | 7/2003 | Sheldon | H01R 12/727 |
| | | | | | 439/92 |
| 9,518,579 | B2 | * | 12/2016 | Scarpinato | G05D 23/023 |
| 2008/0087343 | A1 | * | 4/2008 | Doutt | F16K 31/50 |
| | | | | | 137/625 |

FOREIGN PATENT DOCUMENTS

| | | |
|---|---|---|
| CN | 201126041 | 10/2008 |
| CN | 201126041 Y | 10/2008 |
| CN | 103270352 | 8/2013 |
| CN | 103486300 | 1/2014 |
| CN | 103998757 | 8/2014 |
| CN | 103998758 | 8/2014 |
| DE | 10341703 | 4/2005 |
| DE | 202011100690 | 9/2011 |
| DE | 202011100690 U1 | 9/2011 |
| DE | 112012005656 | 10/2019 |

OTHER PUBLICATIONS

Office Action for the corresponding European Patent Application No. 17465529.0.

Office Action dated Jan. 15, 2021 issued in Chinese Patent Application No. 201880045128.6.

* cited by examiner

VALVE FOR MIXING TWO GAS FLOWS

CROSS REFERENCE TO RELATED APPLICATIONS

This is a U.S. national stage of Application No. PCT/EP2018/067068 filed Jun. 26, 2018. Priority is claimed on European Application No. EP 17465529.0 filed Jul. 7, 2017 the content of which is incorporated herein by reference.

BACKGROUND OF THE INVENTION

1. Field of the Invention

The invention relates to a valve for mixing two gas streams, having a housing, a first gas inlet, a second gas inlet, and a gas outlet, wherein the gas inlets are fluidically connected to the gas outlet.

2. Description of the Prior Art

Valves are used for the mixing of two gas streams, for example in exhaust gas recirculation systems. Among the know designs are valves that have a rotatable throttle flap, which flap can be rotated by an electric motor, simple pneumatic on/off valves, or electromagnetic actuated valves.

What is common to all of these known valves is that they either have a complex structure, as a result of which they are costly, or permit only insufficiently accurate control between the state of completely open and completely closed, if such control is provided at all.

SUMMARY OF THE INVENTION

One aspect of the present invention is a valve that has a simple structure and reliably allows mixing of two gas streams in any desired ratios.

One aspect of the invention relates to a valve for mixing two gas streams, having a housing, a first gas inlet, a second gas inlet, and a gas outlet, wherein the gas inlets are fluidically connected to the gas outlet, wherein downstream of the first gas inlet there is arranged a guide element mounted displaceably inside the housing, wherein, by displacing the guide element, it is possible to control a flow cross section of a flow transfer opening for the transfer flow of the gas volume flowing in through the first gas inlet to the gas outlet through the guide element.

The guide element is formed in such that it can be flowed through by the gas stream flowing in from the first gas inlet. A flow of gas around the guide element is avoided due to sealing elements or accurate guidance in the housing. The guide element is mounted movably in the housing such that, by applying a force to the guide element, a displacement of the guide element can be realized. The movement of the guide element allows a flow cross section, for example an opening in the guide element, to be opened, so that a gas stream from the first gas inlet can flow through the guide element to the gas outlet.

It is particularly advantageous if, by the guide element, it is possible to control the flow cross section for the transfer flow of the gas volume flowing in through the second gas inlet to the gas outlet. This is particularly advantageous since, with a single guide element, it is possible to influence both the gas stream from the first gas inlet and the gas stream from the second gas inlet. This can for example be advantageously realized by sliding the guide element into the flow path downstream of the second gas inlet, whereby the flow path is at least partially blocked. Consequently, the mass flow is reduced. In an extreme position, the guide element can also completely close off the flow path from the second gas inlet to the gas outlet and only allow the gas flow from the first gas inlet to the gas outlet. Such a functionality would make it possible to selectively have only gas from the first gas inlet or gas from the second gas inlet flow to the gas outlet, or to have a gas flow composed of the two gas streams in any desired ratio flow to the gas outlet.

It is also advantageous if the guide element is of sleeve-like design and closes off the flow path downstream of the first gas inlet in a completely fluid-tight manner A sleeve-like guide element can be mounted in a particularly simple manner in a tubular housing section and displaced relative to said section. Furthermore, a sleeve with a defined flow transfer opening is particularly simple to produce.

A preferred exemplary embodiment is characterized in that the guide element has a flow transfer opening on its radial edge region. The guide element particularly advantageously has the flow transfer opening on a radial wall region since, in at least one position of the guide element, the radial wall region bears against the inner walls of the flow path downstream of the first gas inlet. In said position, a transfer flow of the gas from the first gas inlet is prevented. If the guide element is correspondingly displaced to such an extent that the flow transfer opening projects into a region of the valve in which the flow transfer opening is no longer closed off by the inner wall of the flow path beyond the first gas inlet, a gas stream can flow through the guide element and in particular through the flow transfer opening to the gas outlet.

It is also preferable if downstream of the first gas inlet there is a first flow path, along which the guide element can be displaced, wherein the guide element can be moved, at least partially, into a second flow path downstream of the second gas inlet and/or into a third flow path upstream of the gas outlet.

The movement of the guide element into the second or the third flow path ensures that the flow transfer opening is no longer completely covered, or no longer covered at all, by the inner wall of the first flow path and consequently a gas stream can flow through the guide element.

It is furthermore advantageous if the housing has a T-shaped cross section, wherein a first leg forms the first flow path, a second leg forms the second flow path and a third leg forms the third flow path to the gas outlet. A T-shaped form is particularly advantageous since, in this case, the flow paths which are downstream of the gas inlets or upstream of the gas outlet cross one another and therefore a mixing position is created in a simple manner. Moreover, a guide element projecting from one of the flow paths into the mixing position can also influence the flow cross section of the other flow paths.

It is furthermore advantageous if the flow transfer opening is closed off by the wall delimiting the first flow path, as long as the guide element does not project sufficiently far into the second flow path or third flow path. This is advantageous in order to be able to realize a closing-off or opening of the flow transfer opening solely through the displacement of the guide element relative to the first flow path.

It is also expedient if the valve, in a first position, allows a transfer flow of the gas volume from the first gas inlet and a transfer flow of the gas volume from the second gas inlet to the gas outlet, wherein the transfer flow of the gas volume from the first gas inlet is controlled by the open cross-sectional area of the flow transfer opening and the transfer flow of the gas volume from the second gas inlet is controlled by means of that cross-sectional area of the second flow path and/or of the third flow path not blocked by the sleeve-shaped guide element. By sliding the guide element into the second and/or third flow path, the flow cross section of the flow paths can be reduced, as a result of which it is possible to influence the gas quantity flowing through the respective flow path. In an extreme position, it is also possible to completely close off one of the two flow paths into which the guide element is slid.

It is furthermore advantageous if at least one sealing element is provided between the sleeve-like guide element and the wall delimiting the first flow path, whereby a flow around the guide element is avoided. This is advantageous in order to avoid undesired gas flows from the first gas inlet to the gas outlet.

It is furthermore expedient if an actuator arranged outside the housing acts on the guide element, wherein the transmission of force from the actuator to the guide element takes place by a guide rod, which rod projects through the second and/or third flow path and is connected to the guide element on that side which is remote from the first gas inlet. An actuator may for example be a stepper motor or another electric motor that is able to move the guide element in a translatory manner in the first flow path.

It is also advantageous if the guide element has in its interior a guide structure, which directs the gas stream flowing into the guide element to the flow transfer opening. Particularly advantageously, the guide element has an inner shaping which directs the gas stream from the inlet into the guide element to the flow transfer opening. This allows additional pressure losses due to the guide element to be avoided.

BRIEF DESCRIPTION OF THE DRAWINGS

Advantageous refinements of the present invention are described in the subclaims and in the following description of the figures.

The invention will be discussed below in detail on the basis of exemplary embodiments and with reference to the drawings, in which.

DETAILED DESCRIPTION OF THE PRESENTLY PREFERRED EMBODIMENTS

Figure 1:
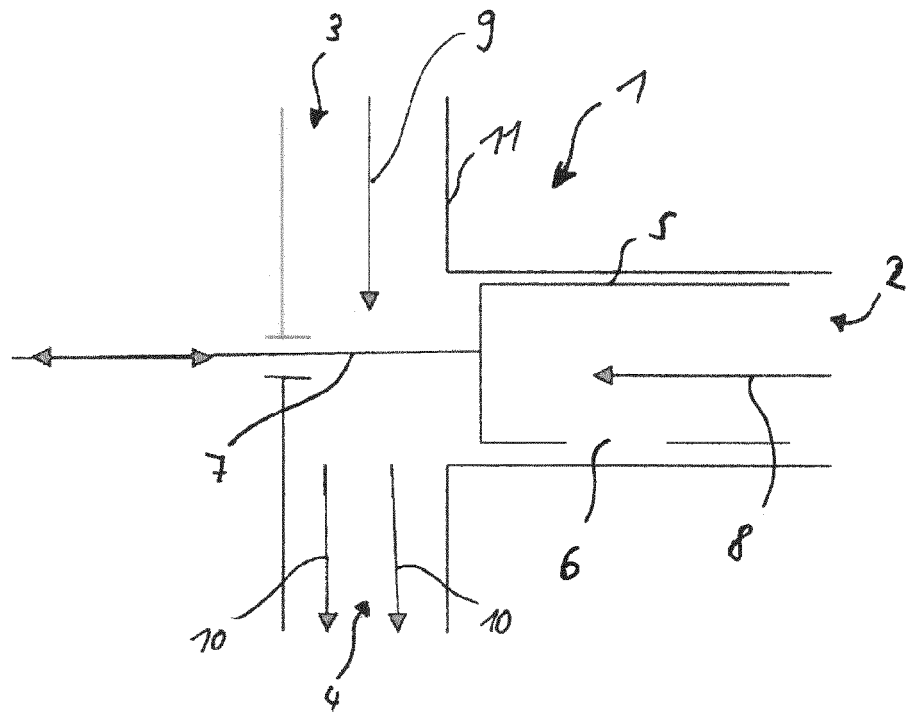
FIG. 1 is a schematic sectional view of a valve.

FIG. 1 is a schematic view of a valve 1, having a first gas inlet 2, having a second gas inlet 3, and having a gas outlet 4. The gas inlets 2, 3 are fluidically connected to the gas outlet 4. Downstream of the gas inlet 2 there is a guide element 5 which is formed as a sleeve and which completely closes off the first flow path. The guide element 5 has a flow transfer opening 6 in a radial wall, which opening is covered by the inner wall of the first flow path.

Gas can flow in through the gas inlets 2, 3 along the arrows 8, 9 and, after being mixed, can flow out of the gas outlet 4 along the arrows 10.

The guide element 5 is connected via a guide rod 7 to an actuator outside of the housing 11 of the valve 1 and can be moved by the actuator in a translatory manner along the first flow path.

As can already be seen from the schematic illustration of FIG. 1, the flow transfer opening 6, in a first position of the guide element 5, is completely covered by the walls delimiting the first flow path, as a result of which a flow through the flow transfer opening 6 is effectively prevented.

If the guide element 5 is displaced far enough to the left, the flow transfer opening 6 is opened, whereby a transfer flow to the gas outlet 4 can take place. Depending on the length of the movement, the flow transfer opening 6 can be opened partially or completely, which allows the gas quantity that is actually transferred to be controlled.

Figure 2:
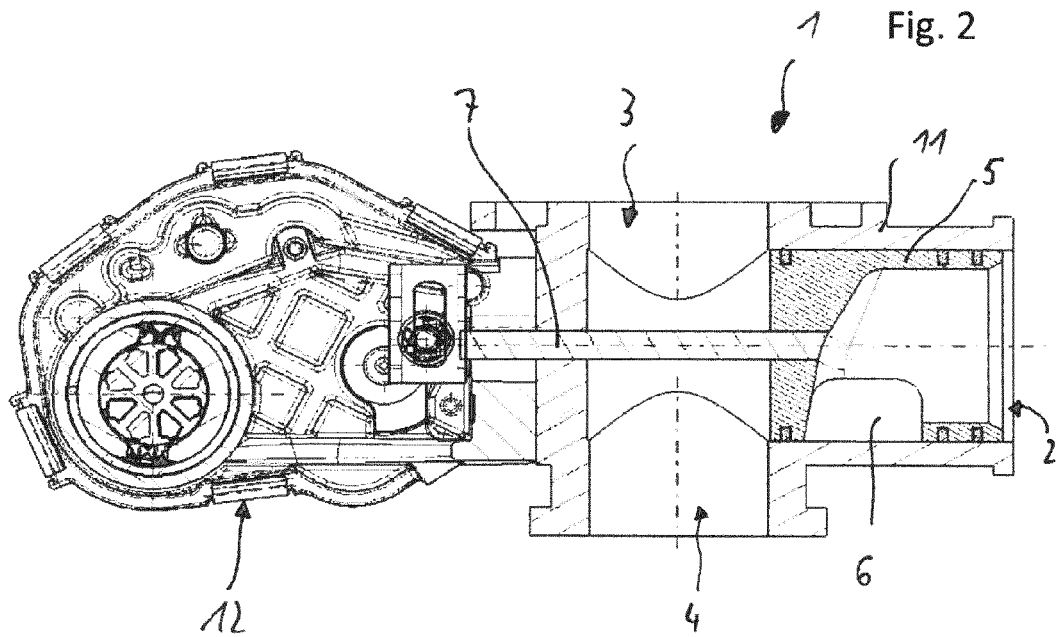
FIG. 2 is a sectional view through a valve, wherein a position of the guide element is shown in which the transfer flow from the first gas inlet to the gas outlet is prevented.
Figure 3:
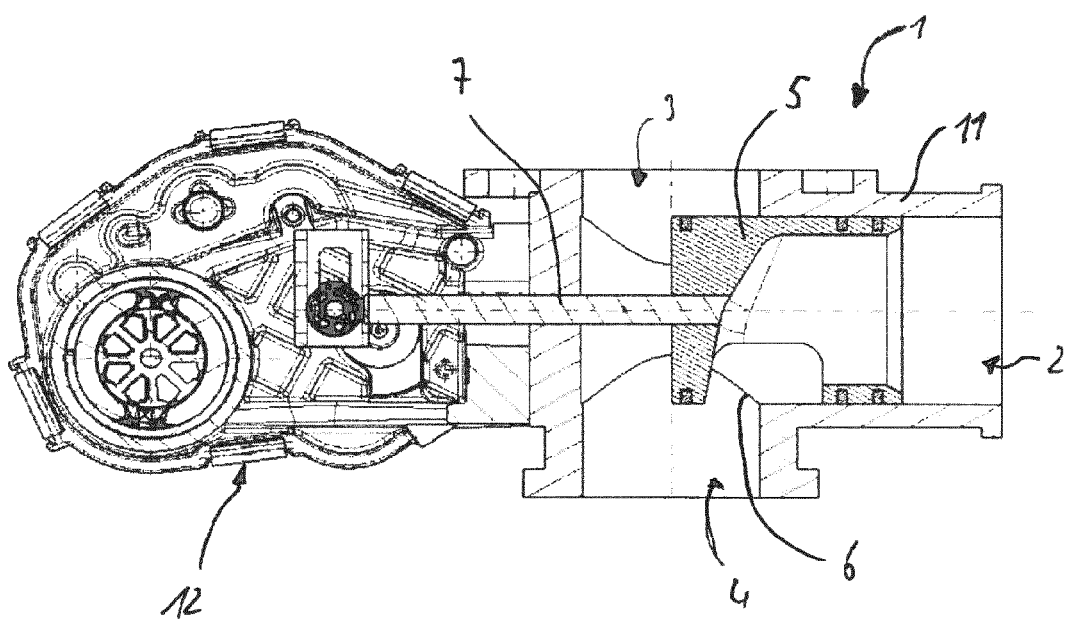
FIG. 3 is a sectional view corresponding to FIG. 2, wherein the guide element is displaced in such a manner that a transfer flow from the first gas inlet to the gas outlet through the flow transfer opening is made possible.

The subsequent FIGS. 2 and 3 show in a possible refinement a valve 1 corresponding to the schematic diagram in FIG. 1. For ease of understanding, the reference signs are retained for identical parts.

FIG. 2 shows a valve 1 as indicated in FIG. 1 in a side sectional view. On the left of the housing 11, there is shown an actuator 12 used for moving the guide element 5.

The flow paths which are downstream of the gas inlets 2, 3 and upstream of the gas outlet 4 are formed in a tubular manner and cross one another at a common point. In FIG. 2, the guide element 5 is positioned completely in the first flow path and therefore closes off the flow transfer opening 6. The gas inlet 2 is thus completely blocked, and for this reason only gas from the second gas inlet 3 can flow to the gas outlet 4.

By retracting the guide element 5 into the mixing point, the active flow cross section of the second flow path, which path is downstream of the second gas inlet 3, is reduced. At the same time, the flow transfer opening 6 is at least partially opened, as a result of which a gas stream from the first gas inlet 2 can also flow to the gas outlet 4.

FIG. 3 shows the valve 1 of FIG. 2, wherein the guide element 5 in FIG. 3 is displaced into the second flow path, whereby the flow transfer opening 6 is at least partially opened. At the same time, the flow cross section downstream of the second gas inlet 3 is reduced.

In the position shown in FIG. 3, gas streams from both gas inlets 2, 3 can flow to the gas outlet 4. In dependence on the open opening cross section of the flow transfer opening 6 and the unblocked flow cross section of the second flow path, a mixture of both gas streams is produced.

The exemplary embodiments of FIGS. 1 to 3 have in particular no limiting nature and serve for illustrating the concept of the invention.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A valve for mixing two gas streams, comprising:
a housing, having:
a gas outlet;

a first gas inlet fluidically connected to the gas outlet; and a second gas inlet fluidically connected to the gas outlet; and a guide element displaceably mounted inside the housing downstream of the first gas inlet to move between a first position and a second position, wherein, displacing the guide element controls a flow cross section of a flow transfer opening for a transfer flow of a gas volume flowing through at least the first gas inlet to the gas outlet through the guide element, wherein the housing has a T-shaped cross section, wherein a first leg forms the first flow path, a second leg forms the second flow path and a third leg forms the third flow path to the gas outlet, wherein in the first position the flow cross section of the flow transfer opening for the transfer flow of the gas volume flowing through the at least the first gas inlet to the gas outlet through the guide element is minimized, and wherein in the second position a base of the guide element is in contact with a wall of the T-shaped cross section and the flow cross section of the flow transfer opening for the transfer flow of the gas volume flowing through the at least the second gas inlet to the gas outlet through the guide element is minimized.

2. The valve as claimed in claim 1, wherein, the guide element, is configured to control the flow cross section for a transfer flow of a gas volume flowing in through the second gas inlet to the gas outlet, wherein in the first position the flow cross section of the flow transfer opening for the transfer flow of the gas volume flowing through the at least the second gas inlet to the gas outlet through the guide element is maximized, wherein in the second position a base of the guide element is in contact with a wall of the T-shaped cross section and the flow cross section of the flow transfer opening for the transfer flow of the gas volume flowing through the at least the second gas inlet to the gas outlet through the guide element is minimized.

3. The valve as claimed in claim 2, wherein the guide element is sleeve-like design and closes off a flow path downstream of the first gas inlet in a completely fluid-tight manner.

4. The valve as claimed in claim 3, wherein the guide element has a flow transfer opening on its radial edge region.

5. The valve as claimed in claim 1, wherein downstream of the first gas inlet there is a first flow path, along which the guide element can be displaced, wherein the guide element is configured to be moved at least partially into one or more of:

a second flow path downstream of the second gas inlet and a third flow path upstream of the gas outlet.

6. The valve as claimed in claim 1, wherein the flow transfer opening is closed off by a wall delimiting the first flow path, as long as the guide element does not project a distance into the second flow path or third flow path.

7. The valve as claimed in claim 6, wherein the valve is configured such that in a first position there is:

a transfer flow of a gas volume from the first gas inlet to the gas outlet, the transfer flow of the gas volume from the first gas inlet is controlled by an open cross-sectional area of the flow transfer opening and a transfer flow of the gas volume from the second gas inlet to the gas outlet, the transfer flow of the gas volume from the second gas inlet is controlled by a cross-sectional area of the second flow path and/or of the third flow path not blocked by a sleeve-shaped guide element.

8. The valve as claimed in claim 6, wherein at least one sealing element is provided between a sleeve-like guide element and the wall delimiting the first flow path, whereby a flow around the guide element is avoided.

9. The valve as claimed in claim 1, further comprising:

an actuator arranged outside the housing and configured to act on the guide element; and a guide rod configured to transmit a force from the actuator to the guide element, wherein the guide rod projects through the second flow path and/or third flow path and is connected to the guide element on a side remote from the first gas inlet.

10. The valve as claimed in claim 1, wherein the guide element has a guide structure in its interior, which directs a gas stream flowing into the guide element to the flow transfer opening.

* * * * *